(12) United States Patent
Spero

(10) Patent No.: US 7,501,100 B2
(45) Date of Patent: Mar. 10, 2009

(54) FILTER SYSTEM FOR ELECTROCHEMICAL AIR SEPARATION DEVICE

(75) Inventor: John F. Spero, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 783 days.

(21) Appl. No.: 10/982,867

(22) Filed: Nov. 8, 2004

(65) Prior Publication Data

US 2006/0099119 A1    May 11, 2006

(51) Int. Cl.
*B01D 50/00*    (2006.01)
(52) U.S. Cl. .................................. 422/180; 422/177
(58) Field of Classification Search ................ 422/168, 422/177, 180; 96/132, 135
See application file for complete search history.

(56) References Cited

U.S. PATENT DOCUMENTS

| 3,362,783 | A | * | 1/1968 | Leak | 423/212 |
|---|---|---|---|---|---|
| 3,780,872 | A | * | 12/1973 | Pall | 210/493.1 |
| 4,151,060 | A | | 4/1979 | Isenberg | 204/195 |
| 4,877,506 | A | | 10/1989 | Fee et al. | 204/242 |
| 5,045,169 | A | | 9/1991 | Feduska et al. | 204/258 |
| 5,169,415 | A | | 12/1992 | Roettger et al. | 55/68 |
| 5,205,990 | A | | 4/1993 | Lawless | 422/121 |
| 5,332,483 | A | | 7/1994 | Gordon | 204/265 |
| 5,441,610 | A | | 8/1995 | Renlund et al. | 204/129 |
| 5,922,178 | A | | 7/1999 | Isenberg | 204/265 |
| 6,033,457 | A | | 3/2000 | Lawless | 95/4 |
| 6,042,703 | A | | 3/2000 | Adler et al. | 204/252 |
| 6,090,265 | A | | 7/2000 | Adler et al. | 205/615 |
| 6,352,624 | B1 | | 3/2002 | Crome et al. | 204/277 |
| 6,432,177 | B1 | | 8/2002 | Dallas et al. | 96/132 |

FOREIGN PATENT DOCUMENTS

| DE | 19854392 | | 5/2000 |
|---|---|---|---|
| GB | 2186211 A | * | 8/1987 |

OTHER PUBLICATIONS

Meixner et al., "Electrochemical Oxygen Separation Using Solid Electrolyte Ion Transport Membranes", Journal of The Electrochemical Society 149 (9) (2002) pp. D132-D136.

* cited by examiner

*Primary Examiner*—Tom Duong
(74) *Attorney, Agent, or Firm*—David M. Rosenblum

(57) ABSTRACT

The present invention provides a filter system for treating air entering an electrochemical air separation device. The filter is provided with first and second filter sections. The first filter section is formed from a plurality of sheets of woven mesh containing surface deposits of one or more substances that are effective to interact and combine with one or more airborne contaminants to remove the same from the air. The second filter section is configured to filter particulate matter and is situated adjacent to the first filter element. The first and second filter sections are peripherally retained within a retaining structure so that the air to be treated passes through the first filter section and then the second filter section. The retaining structure can be releasably attached to a connection flange that is in turn attached to the air inlet of the electrochemical air separation device.

7 Claims, 3 Drawing Sheets

FILTER SYSTEM FOR ELECTROCHEMICAL AIR SEPARATION DEVICE

FIELD OF THE INVENTION

The present invention relates to a filter system for treating air entering an electrochemical air separation device in which contaminants such as sulfur compounds are removed from the air by active surface deposits located within a first filter section and particulate matter is trapped within one or more particulate filters located in a downstream second filter section.

BACKGROUND OF THE INVENTION

Electrochemical devices for the separation of air are employed in several modes of operation. Commonly such devices employ an yttrium stabilized zirconia electrolyte or a cerium gadolinium oxide zirconia electrolyte sandwiched between two porous electrodes. When an electric current is applied to the electrodes and air is introduced to the electrode serving as a cathode, oxygen within the air ionizes and is transported through the membrane to the opposite side of the electrode in contact with the anode electrode. The oxygen ions recombine into elemental oxygen and in so doing give up their excess electrons to the anode electrode. In other electrochemical air separation devices, a conductor connects the electrodes and the driving force is a partial pressure differential between the cathode and the anode electrodes. In yet a further electrochemical air separation device employed as a fuel cell, fuel is introduced to the anode electrode that reacts with the oxygen to establish a partial pressure differential. Combustion of the fuel is supported by the separated oxygen. The electrons passing through the conductor can be channeled towards a load for generation of electric power.

It has been found that electrochemical devices will degrade over a period of time. One major reason for this is hydrogen sulfide and sulfur oxides contained in the air. The sulfur oxides will combine with the yttrium stabilized zirconia to produce small electrolyte defects that will allow the air to pass from the cathode to the anode side. Since no oxygen ionization occurs, performance is degraded.

It is well known in the art to filter particulates to maintain proper operation of the electrochemical air separation device. For instance, the use of a filter with respect to electrochemical devices for filtration of particulate matter is referenced in U.S. Pat. Nos. 6,352,624, 5,332,483 and 5,205,990. In U.S. Pat. No. 6,432,177 a filter system is disclosed in connection with a fuel cell that has a particulate filter that can be a layered structure including a high efficiency particulate accumulation filter and several sheets of coarser filter medium to filter out particulate matter. Located downstream of this filter is a chemical filtering portion that is designed to trap acidic compounds such as sulfur oxide. It is envisioned in this patent that adsorbent materials are used that include a carrier that can be a metal oxide.

The central problem with filtering system of the prior art is that eventually they become heavily laden with chemical and physical contaminants and need to be replaced. It is therefore desirable that the filter system be constructed simply and as inexpensively as possible. Working against this is that for chemical adsorption to take place, the filter must have a high surface area to contain a sufficient amount of an active component such as an adsorbent. However, to have a high surface area for a filter element, the porosity must be increased by increasing the number of pores and therefore decreasing the pore sizes. However, as pore sizes decrease, it becomes difficult to form deposits of such active component without closing off the pores. Moreover, in use of the filter, the small pores can become clogged with reaction components as well as particulate matter of the active component that has broken off of the substrate.

As will be discussed, the present invention provides an inexpensive filter system for an electrochemical air separation device that can easily and inexpensively be replaced in that employs a chemical filtering section of high surface area that is specifically designed to filter or trap airborne contaminants such as sulfur dioxide and hydrogen sulfide.

SUMMARY OF THE INVENTION

The present invention provides a filter system for treating air entering an electrochemical air separation device that is designed to separate oxygen from air. As used herein and in the claims, the term "electrochemical air separation device" is any one of the class of devices described in detail hereinabove that utilize an electrolyte sandwiched between electrodes and that include fuel cells and oxygen concentrators that are either electrically or pressure driven or fuel cells. The filter system is provided with a first filter section that is formed from a plurality of sheets of woven mesh containing surface deposits of at least one substance effective to interact and combine with at least one airborne contaminant to remove the at least one airborne contaminant from the air. The terms "interact and combine" include all mechanisms by which contaminants may be removed. For instance, the substance can be an adsorbent in which the interaction and combination is by retention in the adsorbent. The substance can be one that is designed to chemically react with the contaminant and as such, the interaction and combination is by known chemical means. Combinations of mechanisms such as adsorption and chemical reaction can be used. In a particular embodiment of the present invention, the substance can be zinc oxide to react with and remove sulfur compounds from the air.

A second filter section is configured to filter particulate matter and is situated adjacent the first filter section. A retaining structure peripherally engages the first filter section and the second filter section at opposite locations thereof so that the air to be treated is constrained to pass through the first filter section and then the second filter section. At least one connection element is provided to connect the retaining structure to an air inlet of the electrochemical device.

The formation of the first filter section from several sheets of woven mesh is advantageous on several grounds. Each sheet of mesh can have large openings defined between strands forming the mesh so that the active component, such as zinc oxide, can be formed without closing off the openings. Yet, when several woven mesh sheets are obtained and positioned against one another, the surface area for such active component can be increased to an effective level while the open area can be controlled to provide a filter section having the same open area that would otherwise have been obtained with a single sheet of high porosity having a smaller pore size that the openings provided by each sheet of woven mesh.

Such structure can be inexpensively fabricated by forming the woven mesh of galvanized wire heated in an oxygen containing gas to form the zinc oxide deposit. Preferably, the woven mesh has openings with the mesh size of between 20 and about 200 mesh and the galvanized wire defining the openings preferably has a wire diameter of between about 0.002 inches and about 0.0625 inches. First filter section is preferably formed of three of such sheets which provide an open area of approximately 12 percent of the area of the sheets.

Preferably, the second filter section is formed of at least a high efficiency particulate accumulation filter sheet that is configured to filter particulates of at least about 0.03 microns in diameter at an efficiency of about 99.97 percent. A second particulate filter sheet can be located adjacent to the first filter sheet that is designed to filter larger particles. Such second filter sheet is designed to filter particles with less than 90% efficiency in a size range of between about 3 and about 10 microns based on ASHRAE Standard 52.2 and is positioned to be directly adjacent the first filter element. In any embodiment of the present invention the second filter section can be provided with accordion-like folds to further increase its surface area.

In order to allow for rapid and simple replacement of a filter system of the present invention, a connection flange can be permanently connected to the inlet of the electrochemical device. The connection flange has at least one inlet opening for passage of the air to the electrochemical air separation device after having passed through the second filter section. A clasp can be provided to releasably connect the retaining structure to the connection flange to permit removal and replacement of the retaining structure and the first filter element and the second filter element as a single unit.

The filter system can be of cylindrical configuration. In such case, the first filter section and the second filter section are each of cylindrical configuration and the opposite locations for attachment to the retaining structure are situated at opposite and circumferential locations. The connection flange has a planar sealing surface and the inlet opening is defined in the planar sealing surface. The retaining structure can be formed of first and second end caps connected to the first filter section and the second filter section at the opposite location as to form a cylindrical filter structure having an outlet opening defined in the second of the end caps. The cylindrical filter structure is adapted to be positioned with a second end cap sealed against the planar sealing surface of the connection flange and the outlet opening and registry with the inlet opening of the connection flange. The clasp is a threaded connector passing through the first and second end caps and the flange to connect the cylindrical filter structure to the connection flange. The threaded connector has a threaded engagement at one end thereof so as to permit the cylindrical filter structure to be removed and replaced as a unit.

Alternatively, the first filter section and the second filter section can be of rectangular configuration and the opposite locations thereof can be situated at opposite rectangular side locations. The retaining structure can be formed of elongated bar-like elements connected end to end in a rectangle and in turn connected to the first filter section and the second filter section at the opposite rectangular side locations thereof to form a box-like filter structure. The connection flange has a planar sealing surface and the at least one inlet opening is defined in the planar sealing surface. The box-like filter structure is operable to be positioned against the planar sealing surface of the connection flange with the elongated bar-like element sealed against the planar. The sealing surface of the connection flange and the at least one opening located between the elongated bar-like elements. The clasp has a rectangular frame positioned against the bar-like elements and threaded connectors passing through the connection flange in the frame to permit removal of the frame and therefore replacement of the box-like filter structure as a single unit.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
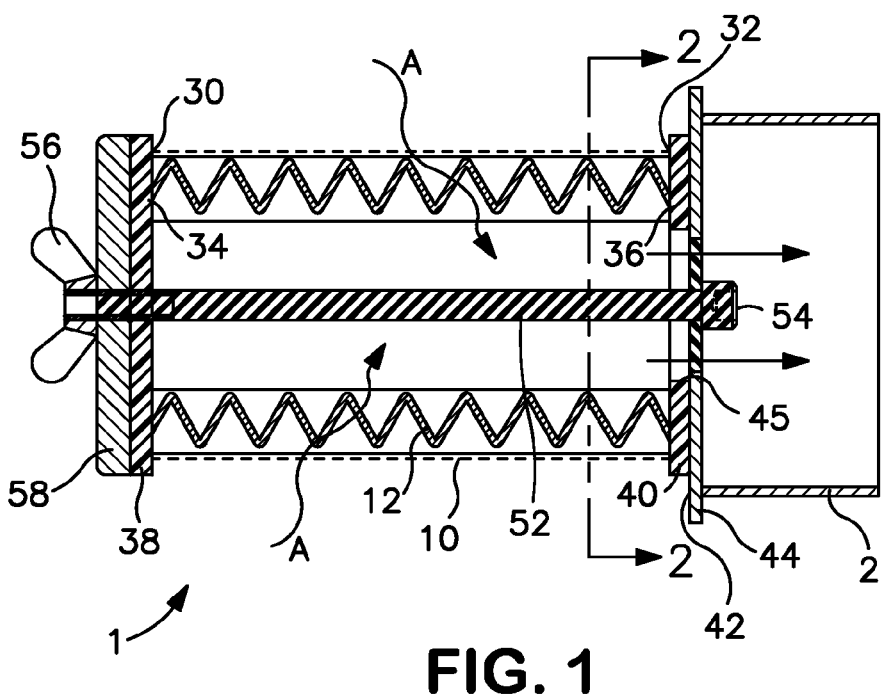
FIG. 1 is a sectional, schematic view of a filter system in accordance with the present invention.
Figure 2:
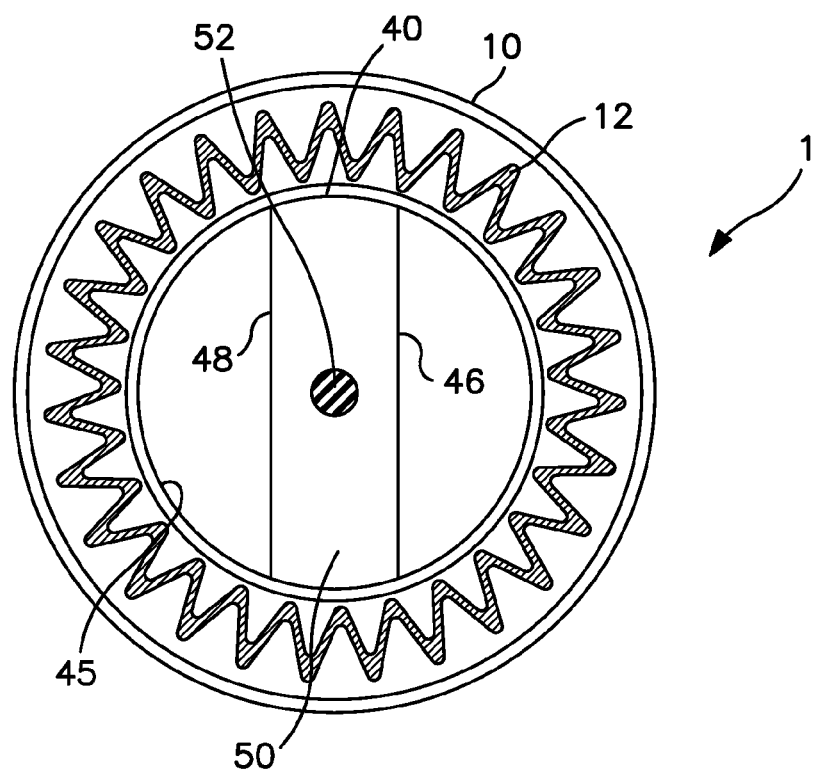
FIG. 2 is an enlarged sectional view of FIG. 1 taken along line 2-2 of FIG. 1.

With reference to FIGS. 1 and 2, a filter system 1 in accordance with the present invention is illustrated. Filter system 1 has a first filter section 10 that is designed to remove sulfur compounds from the air, principally sulfur oxides and hydrogen sulfides when present in minute quantities. Sulfur oxides will react with the zinc oxide to produce zinc sulfates. The air flow indicated by arrowheads "A" draw particles of the zinc sulfides into the air inlet to the electrochemical device. Consequently, downstream of the first filter section 10 a second filter section 12 is provided to trap particulate matter. Although not illustrated, the electrochemical device that is used in connection with filter system 1 can be situated within a cabinet having its own air inlet and particulate filter to filter particulate contaminants.

Although the filter system 1 and its other embodiments is described with respect to first filter section 10 containing surface deposits of zinc oxide to remove sulfur compounds from the air, it is understood that this is for exemplary purposes only. Other substances could also be included that would be effective to remove other contaminants. For instance, activated carbon, zeolite, or clays could be applied onto first filter section 10 by washcoats, impregnation, and/or precipitation techniques to remove sulfur, chlorine, and hydrocarbons.

Figure 3:
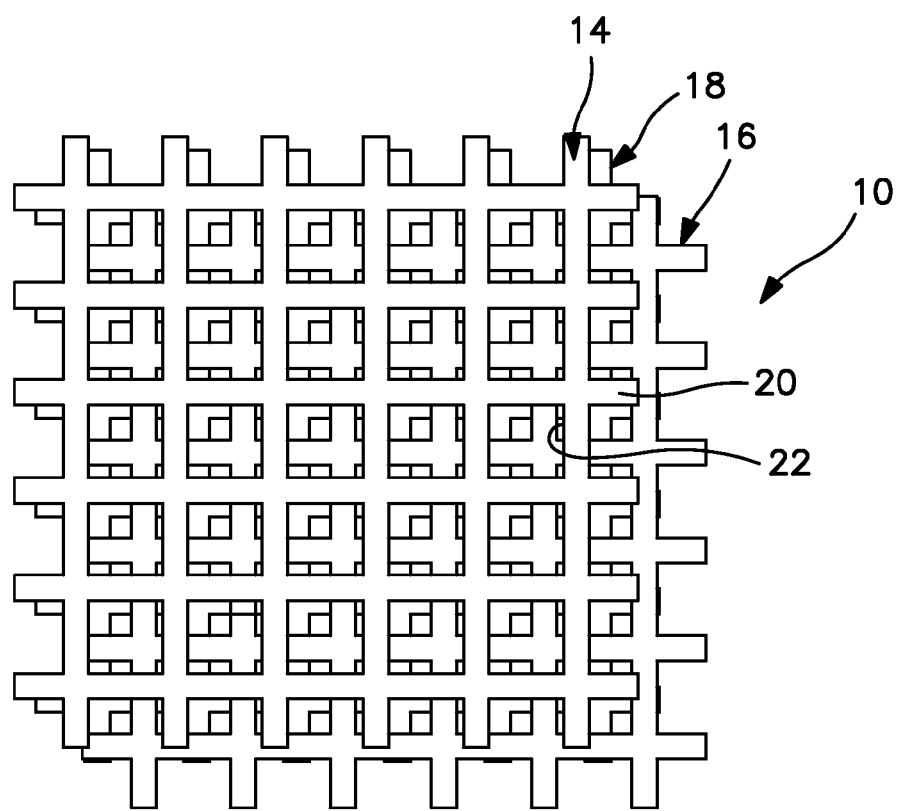
FIG. 3 is an enlarged top plan, fragmentary view of the first filter section of the present invention.

With brief reference to FIG. 3, first filter section 10 is formed by a plurality of sheets of woven mesh. Preferably three sheets of woven mesh 14, 16 and 18 are employed. Although the zinc oxide can be deposited on the woven mesh, preferably, the woven mesh is formed of galvanized wires such as wire 20 that has been heated in an oxygen containing gas to form the zinc oxide deposits. Preferably, the woven mesh has openings, such as indicated as opening 22, of between about 20 and 200 mesh. Each of the wire strands, for instance wire 20, forming the openings, such as 22, has a wire diameter of preferably between about 0.002 inches and about 0.0625 inches. When three of such sheets are used, an open area of about 12 percent is provided than the first filter section 10.

The provision of the multiple sheets wire mesh, 14, 16 and 18 provides an expeditious way of providing a large open area with large openings rather than a number of small openings that can become clogged either during forming the active surface deposits or during use from particulate matter that can be formed by surface deposits breaking off the mesh or from reaction products or from airborne particulate matter.

Figure 4:
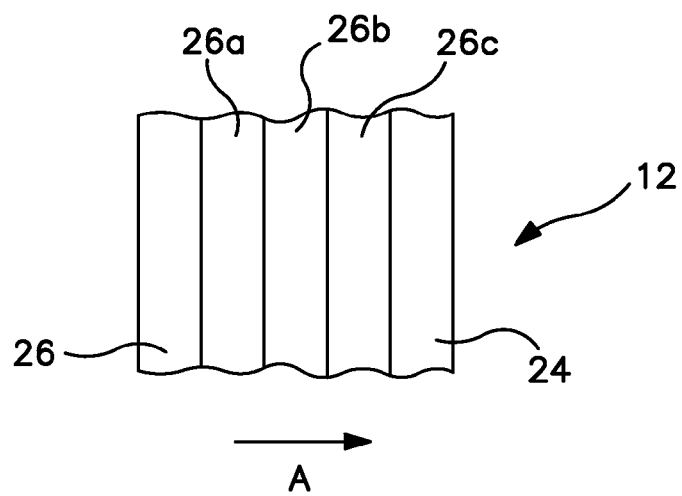
FIG. 4 is an enlarged schematic, fragmentary elevational view of filter sheets forming the second filter section of a filter system of the present invention.

With reference to FIG. 4, second filter section 12 is again of sheet-like form and is provided with a high efficiency particulate accumulation filter sheet 24 that is configured to filter particulates at least about 0.03 microns in diameter and at an efficiency of about 99.97 percent. Preferably, a coarser filter sheet 26 could be provided upstream of positioned adjacent to first filter section 10. Such filter sheet is designed to filter particles with less than 90% efficiency in a size range of between about 3 and about to 10 microns based on ASHRAE Standard 52.2. As indicated, intermediate filter sheets 26a, 26b and 26c could be provided having ever decreasing pore sizes. This having been said, second filter section 10 could be formed by a single filter sheet 24 or a filter sheet 24 with an upstream coarser filter sheet 26.

With specific reference again to FIG. 1, a retaining structure is provided to retain first and second filter sections 10 and 12 which are of cylindrical configuration and the opposite locations are at opposite circumferential end locations 30 and 32 for first filter section 10, and opposite circumferential end locations 34 and 36 for filter section 12. The retaining structure is formed by first and second end caps 38 and 40 which can be formed of rubber or other resilient elastomeric compound. The resultant end caps 38 and 40 of first and second filter elements 10 and 12 form a cylindrical filter structure which is adapted to be positioned with second end cap 40 positioned against a planar surface 42 of a connection flange 44. The resiliency of the material provides a seal for such cylindrical filter structure.

Connection flange 44 can be permanently affixed to air inlet 2 of the electrochemical air separation device. The air indicated by arrowheads "A" is thereby constrained to pass through first filter section 10 to remove the sulfur compounds from the air and then through the second filter section 12. Section end cap 40 is provided with a circular opening 45 and connection flange 44 is provided with two semi circular openings 46 and 48 separated by a central connection section 50 for passage of the filtered incoming air. The cylindrical filter structure is connected to the connection flange by a clasp that is formed of a rod 52 that can be threaded at opposite ends to engage at one end a threaded bushing 54 connected to central connection section 50 and a wing nut 56 that bears against a resilient washer 58 also preferably formed of rubber or other elastomeric compound. Wing nut 56 may be unthreaded from connection rod 52 to permit the cylindrical filter structure to be installed and discarded.

There are other possibilities to provide a releasable connection of such cylindrical filter structure. Although not illustrated, end cap 40 could be provided with a threaded sleeve and air inlet 2 could be provided with internal threading to permit the cylindrical filter structure to threaded into position for removal and replacement as a unit.

Figure 5:
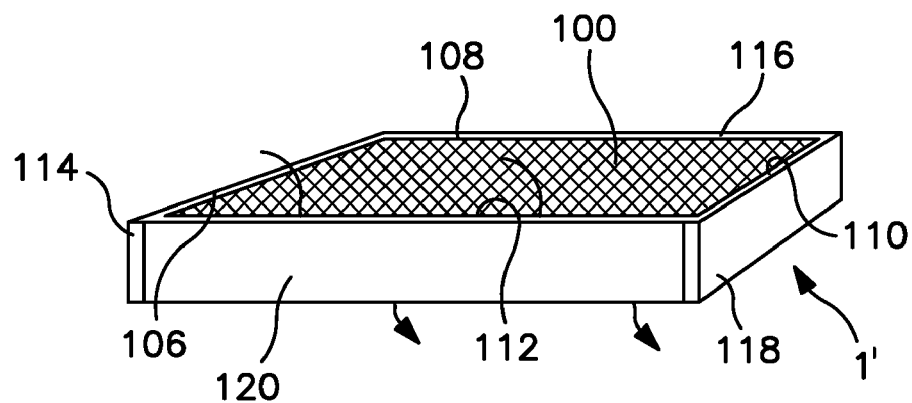
FIG. 5 is a perspective view of an alternative embodiment of the filter system of the present invention utilizing a box-like structure.
Figure 6:
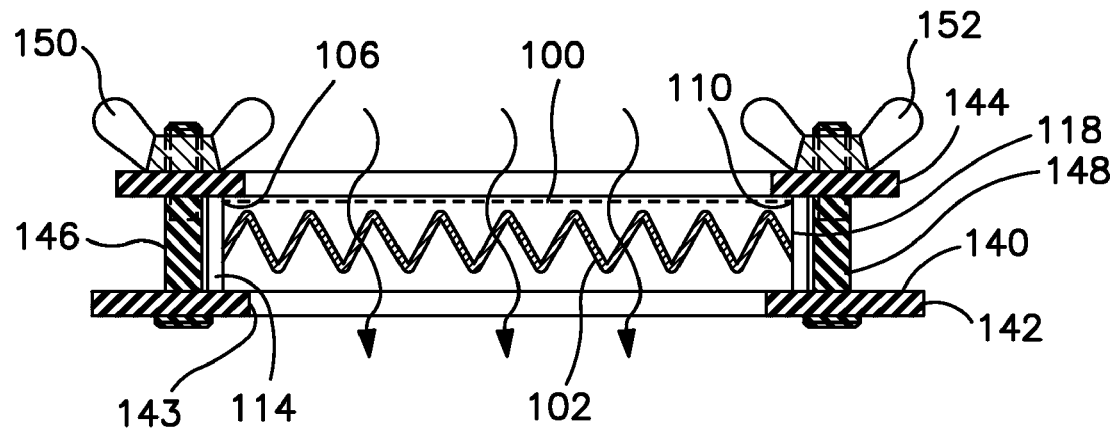
FIG. 6 is a sectional view of the box-like structure of FIG. 5 attached to a connection flange.

With reference to FIGS. 5 and 6, a filter system 1' can be provided. Filter system 1' has first and second filter sections 100 and 102. Each of the first and second filter sections 100 and 102 are of sheet form and are formed in the same manner as first and second filter elements 10 and 12 described hereinabove. First and second filter sections 100 and 102 are of rectangular location and are connected at opposite rectangular side locations thereof, namely, 106, 108, 110 and 112 to elongated bar-like elements 114, 116, 118 and 120 connected end to end in a rectangle to form a box-like filter structure.

The aforesaid box-like filter structure is adapted to be positioned against a planar sealing surface 140 of a connection flange 142 that is in turn connected to air inlet 2 (not shown in this drawing) of the electrochemical air separation device. Connection flange 142 is provided with a rectangular opening 143 for passage of the filtered air. In such embodiment, the clasp structure is formed of a rectangular frame 144 positioned against bar-like elements 114, 116, 118 and 120. Threaded connectors 146 and 148 pass through frame 144 and are attached to connection flange 140. Wing nuts 150 and 152 allow for removal of the frame 144 and replacement of the box-like filter structure. Although only two threaded connectors 146 and 148 are shown in the illustration, it is understood that four of such connections would preferably be used so as to be located at the corners of rectangular frame 144.

While the present invention has been described with reference to a preferred embodiment, as will occur to those skilled in the art, numerous changes, omissions and additions can be made without departing from the spirit and the scope of the present invention.

What is claimed is:

1. A filter system for treating air entering an electrochemical air separation device designed to separate oxygen from air, said filter system comprising:
    a first filter section formed of a plurality of sheets of woven mesh containing surface deposits of at least one substance effective to interact and combine with at least one airborne contaminant to remove the at least one airborne contaminant from the air;
    a second filter section configured to filter particulate matter and situated adjacent to the first filter section;
    the second filter section having accordion-like folds and formed of at least a high efficiency particulate accumulation filter sheet configured to filter particulates of at least about 0.03 microns in diameter and at an efficiency of about 99.97 percent
    a retaining structure peripherally engaging the first filter section and the second filter section at opposite locations thereof so that the air to be treated is constrained to pass through the first filter section and then the second filter section;
    a connection flange permanently connected to an air inlet of the electrochemical device; and
    a clasp releasably connecting the retaining structure to the connection flange to permit removal and replacement of the retaining structure and the first filter element and the second filter section as a single unit.

2. The filter system of claim 1, wherein said at least one substance is zinc oxide and the at least one airborne contaminant is sulfur compounds that react with the zinc oxide.

3. The filter system of claim 2, wherein the woven mesh is formed of galvanized wire heated in an oxygen containing gas to form the zinc oxide deposits, the woven mesh has openings with a mesh size of between about 20 and about 200 mesh and the galvanized wire defining the openings has a wire diameter of between about 0.002 inches and about 0.0625 inches.

4. The filter system of claim 3, wherein the first filter section is formed of three of said sheets.

5. The filter system of claim 1, wherein the second filter section is formed by a particulate filter sheet, located directly adjacent to the first filter section, designed to filter particles with less than 90% efficiency in a size range of between about 3 and about to 10 microns and the high efficiency particulate accumulation filter sheet located directly adjacent to the particulate filter sheet.

6. The filter system of claim 1, wherein:

the first filter section and the second filter section are each of cylindrical configuration and the opposite locations are situated at opposite end circumferential locations;

the connection flange has a planar sealing surface and an inlet opening defined in the planar sealing surface;

the retaining structure has first and second end caps connected to the first filter section and the second filter section at the opposite end circumferential locations thereof to form a cylindrical filter structure having an outlet opening defined in the second of the end caps;

the cylindrical filter structure adapted to be positioned with the second end cap sealed against the planar sealing surface of the connection flange and the outlet opening and registry with the inlet opening of the connection flange; and the clasp is a threaded connector passing through the first and second end caps and the flange to connect the cylindrical filter structure to the connection flange and having a threaded engagement at least one end thereof so as to permit the cylindrical filter structure to be removed and replaced as a unit.

7. The filter system of claim 1, wherein:

the first filter section and the second filter section are each of rectangular configuration and the opposite locations thereof are situated at opposite rectangular side locations;

the retaining structure has elongated bar-like elements connected end to end in a rectangle and in turn connected to the first filter section and the second filter section at the opposite rectangular side locations thereof to form a box-like filter structure;

the connection flange has a planar sealing surface and an inlet opening is defined in the planar sealing surface;

the box-like filter structure is operable to be positioned against the planar sealing surface of the connection flange with the elongated bar-like elements sealed against the planar sealing surface of the connection flange and the inlet opening situated between the elongated bar-like elements; and the clasp has a rectangular frame positioned against the bar-like elements and threaded connectors passing through the connection flange and the frame to permit removal of the frame and therefore, replacement of the box-like filter structure as a single unit.

\* \* \* \* \*